Patented Aug. 29, 1944

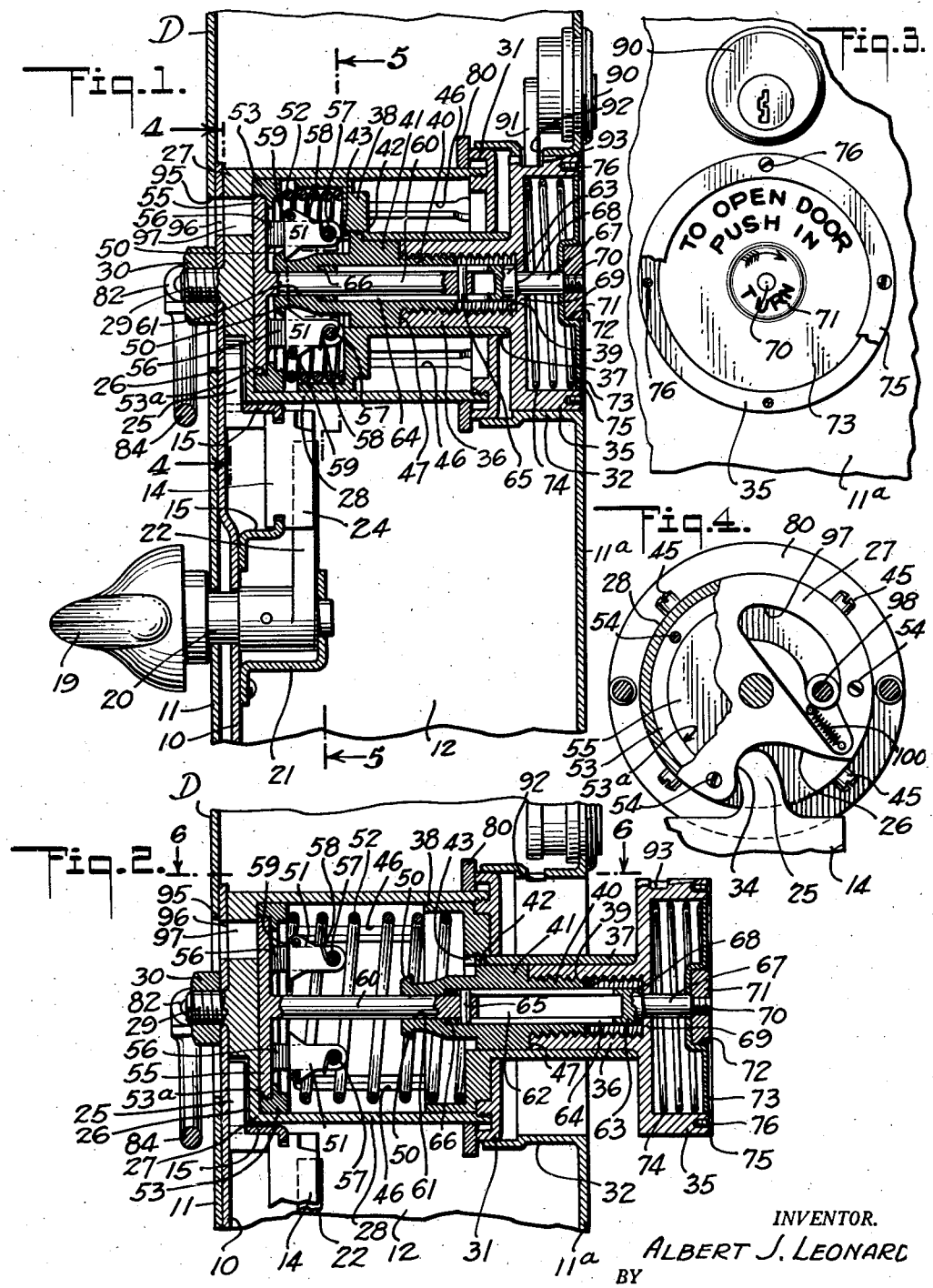

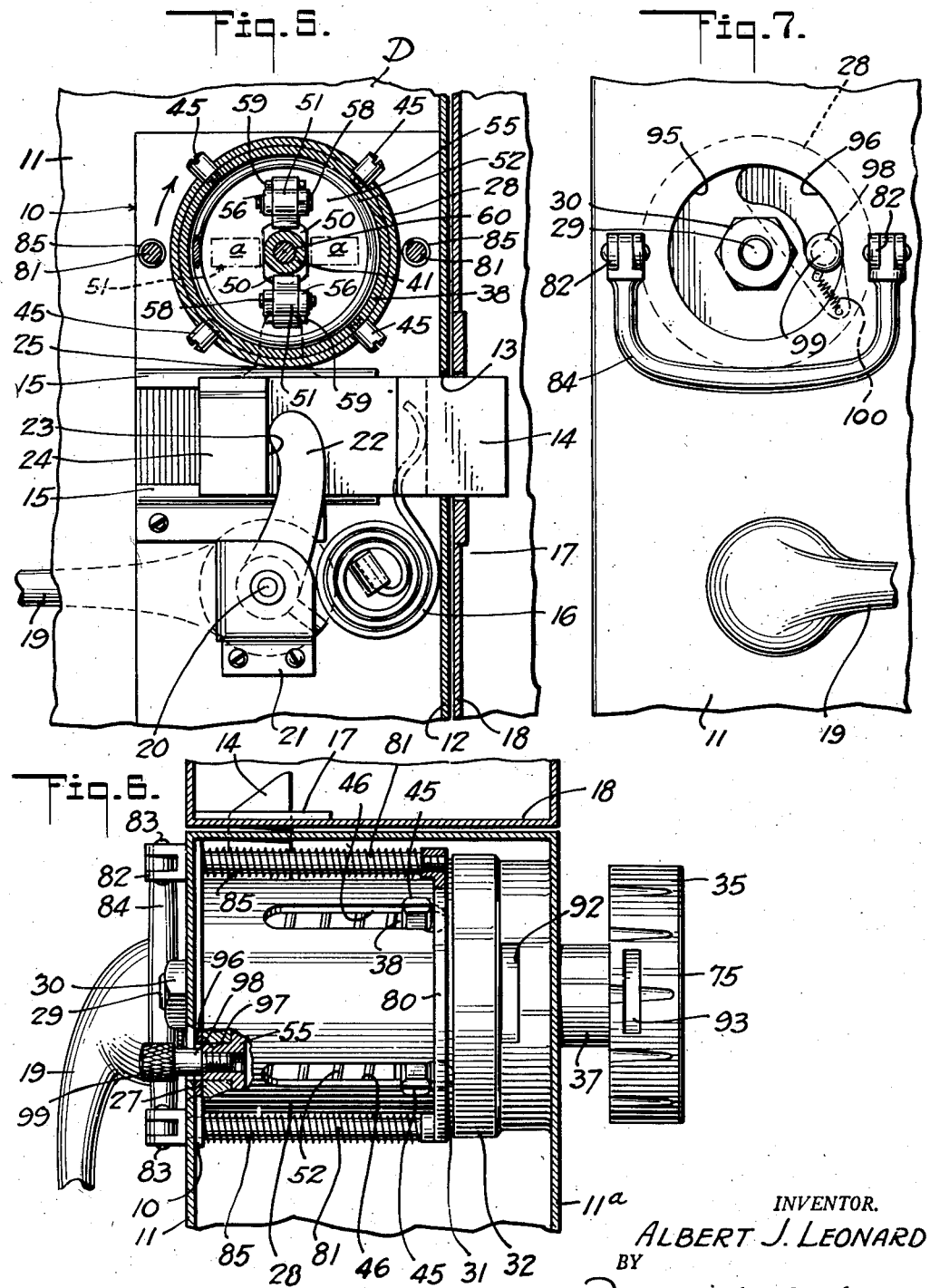

2,357,049

UNITED STATES PATENT OFFICE 2,357,049

LOCK WITH RECESSED HANDLE FOR AIRCRAFT

Albert J. Leonard, Hollywood, Calif.

Application March 15, 1943, Serial No. 479,224

20 Claims. (Cl. 70—208)

This invention relates generally to locking mechanisms and operating handles thereof, and more particularly to devices of this nature as applied to aircraft.

An object of the invention is to provide a lock particularly adapted, although not necessarily, for the doors of aircraft and structurally characterized by means enabling an outside operating member or handle to be fully recessed in the body of a door so as to present a flush exterior surface and thus eliminate wind resistance; whose outside operating member can be instantly manipulated from its recessed position to a projected position for operation of the lock from the outside of the aircraft in the event of an emergency or crash preventing the occupants of the aircraft from reaching the door; whose outside operating member can be released from its recessed position to its operating position from within the aircraft in the event that the pilot or other persons should desire to open the door while in a hangar or on a landing field; whose outside operating member can be moved to its recessed position from inside the aircraft during flight should the operating member have inadvertently been left in its projected position; whose mechanism is simple and rugged in construction, not adversely affected by vibration, relatively light in weight, compact to the extent that the lock can be installed in the relatively small space available in the door of a bombing plane; and which provides for locking of the outside operating member in its recessed position to securely lock the door closed against access to the interior of the aircraft without use of the proper key.

With these and other objects in view, the invention resides in the combinations, arrangements and functional relationships of elements as set forth in the following specification and particularly pointed out in the appended claims.

In the accompanying drawings,

Figure 1 is a vertical sectional view of one form of lock with recessed handle for aircraft embodying this invention applied to a door and illustrating the outside operating member in its recessed position;

Figure 2 is a fragmentary view similar to Figure 1 and illustrating the outside operating member in its projected operating position;

Figure 3 is a fragmentary view of the invention in outside elevation;

Figure 4 is a transverse sectional view taken on the line 4—4 of Figure 1, and partly broken away to show parts at the rear of the sectional plane;

Figure 5 is a transverse sectional view taken on the staggered line 5—5 of Figure 1;

Figure 6 is a horizontal sectional view taken on the line 6—6 of Figure 2;

Figure 7 is a fragmentary view of the invention in inside elevation.

Referring specifically to the drawings, the invention in its present embodiment is illustrated as being installed in the metal frame of a door D of the type employed in bomber aircraft, although it will be understood that the invention is capable of use in many other environments, so that the invention is not to be limited to the specific application shown and described.

The invention is composed of a support in the form of a rectangular plate 10 rigidly secured to the inside frame member 11 of the door D in any suitable manner and against the lock stile 12 which latter has an opening 13 in which works a bolt 14 reciprocably mounted in guides 15 on the plate 10 as shown in Figures 1 and 5. The bolt 14 is urged by a spring 16 to its projected and locking position for co-action with a keeper plate 17 in the door jamb 18, and is adapted to be retracted from the inner side of the door D by an operating member or handle 19. For this purpose the handle 19 is provided with a shaft 20 rotatably mounted in the plate 10 and in a bracket 21 fixed to the latter. An arm 22 is pinned to the shaft 20 and engages a shoulder 23 formed by a lug 24 on the bolt 14 to retract the bolt against the action of the spring 16 upon actuation of the handle 19.

The bolt 14 is provided with a second lug 25 entering a recess 26 in the end wall 27 of a cup shaped cylindrical housing 28. A trunnion 29 projects axially from the wall 27 through the plate 10 and is threaded to receive a nut 30 to confine the housing against axial displacement. A bearing cup 31 constituting a journal, is threaded onto the other and open end of the housing 28 and extends into a bearing sleeve 32 projecting inwardly from the outer frame member 11a of the door for co-action with the sleeve and with the trunnions 29 and frame member 11 in rotatably mounting the housing 28 in the door. One wall of the recess 26 provides a shoulder 34 engageable with the lug 25 to retract the bolt 14 against the spring 16 upon rotational movement of the housing 28 in the direction of the arrow in Figure 5 by means of a rotatable and axially movable outside operating member in the form of a cup shaped cylindrical knob 35 when occupying its axially projected and operating position shown in Figures 2 and 6, all in a manner to be later fully described.

The knob 35 is provided with a hub 36 freely received in a tubular shank 37 projecting from a head or plunger 38 slidably mounted in the housing 28. The hub 36 is provided with a threaded bore 39 into which is tightly screwed the externally threaded tubular shank 40 of a keeper member 41 having a key 42 seating in a keyway 43 in the head 38 so as to maintain a fixed relationship circumferentially between the keeper member 41 and the head 38, which constitutes a supporting portion for the operating member 35, and to operatively connect the knob 35, keeper member 41 and head 38 for rotary and axial movements as a unit.

The head 38 is provided with a plurality of radial pins 45, four in number and equally spaced circumferentially to project into longitudinal slots 46 in the housing 28 as shown in Figure 6 so as to provide a splined or sliding key connection between the knob 35 and the housing by which the latter is operatively connected to the knob for rotational movement thereby, it being understood that the direction of rotation of the knob to effect retraction of the bolt 14 is such that the hub 36 of the knob tends to tighten on the shank 40 of the keeper member 41 and seats against an annular shoulder 47 on the latter.

The keeper member 41 is provided with diametrically opposed keeper lugs 50 co-actable with dogs 51 to provide a latching device for releasably retaining the knob 35 in its recessed or non-operating position shown in Figure 1 against the action of a coil spring 52 in the housing 28, with one end of the spring bearing against the head 38, and the other end of the spring bearing against a retaining ring 53 secured in the housing against the end wall of the latter by screws 54 (Figure 4). The retaining ring 53 is provided with an annular groove 53a in which is rotatably mounted a support for the dogs in the form of a disk 55 having pairs of spaced ears 56 between which the dogs are pivotally mounted at diametrically opposed positions by means of pivot pins 57. Coil springs 58 on the pins 57 urge the dogs to their latching positions with respect to the keeper lugs 50. Stop pins 59 carried by the dogs engage the ears 56 to limit the movement of the dogs under the action of the springs 58.

Secured to the disk 55 centrally thereof is a shaft 60 extending into the bore 61 of the keeper member 41 and into the bore 62 of a tubular shaft 63 rotatably mounted in an enlarged portion of the bore 61. The shafts 60 and 63 constitute an axially extensible and contractible actuator, and the shaft 63 is provided with diametrically opposed longitudinal slots 64 receiving the ends of a pin 65 extending diametrically through the rod 60 to provide an operative connection thereto for rotation of the disk 55 by the actuator.

The inner end of the shaft 63 seats against an annular shoulder 66 in the keeper member 41 and has its outer end projecting into the knob 35 and reduced in diameter at 67 to provide an opposed annular shoulder 68 seating against the bottom wall 69 of the knob 35 so as to confine the shaft 63 against axial displacement. The outer extremity of the shaft 63 is further reduced in diameter and is externally threaded as indicated at 70 to receive a knob 71 adapted to seat in a pocket 72 formed in a cover plate 73 freely mounted in the knob 35 on the portion 67 of the shaft 63 and normally urged by a coil spring 74 against a stop ring 75 secured to the knob 35 by screws 76. Under the action of the spring 74, the cover plate 73 is urged axially outward of the knob 35 so that the knob 71 is received in the pocket 72 to co-act with the knobs in providing an unbroken exposed surface substantially flush with the outside frame member 11a of the door D when the knob 35 is latched in its recessed position in the bearing sleeve 32 by co-action of the keeper lugs 50 with the dogs 51 as shown in Figure 1, thus eliminating any projection which would offer resistance to the air during flight of the aircraft.

A latching lug 80 is slidably mounted on the housing 28 and has secured thereto at diametrically opposed points rods 81 extending through the inside frame member 11 and having yokes 82 to which is pivotally connected at 83, the parallel arms of a U-shaped handle 84. Coil springs 85 on the rods 81 urge the ring 80 to the extreme position shown (Figure 6), for co-action with the pins 45 in enabling the knob 35 to be moved from projected to recessed position by a pull exerted upon the handle 84 so as to latch the knob 35 in recessed position from the inner side of the door when closed.

A key controlled lock 90 of standard construction can be supported in the outer frame member 11a so that in the locking position of the lock, its rotary bolt 91 will project through a slot 92 in the bearing sleeve 32 into a groove 93 in the periphery of the knob 35 to lock the latter in recessed position and thus prevent opening of the door by the knob without the use of the proper key.

The inside frame member 11 is provided with a circular opening 95 exposing registering arcuate slots 96 and 97 in the plate 11 and end wall 27 of the housing 28, respectively, through which slots projects a pin 98 threaded into the disk 55 (Figure 6) and having a knurled knob 99 by which the pin can be actuated from the normal position shown in Figure 7 to which it is urged by a spring 100 (Figure 4) releasably retaining the disk in such circumferentially disposed position that the dogs will be in the path of axial movement of the keeper lugs 50 when the knob 35 is pushed inwardly to its recessed position shown in Figure 2 for co-action of the dogs and keeper lugs in latching the knob in such position in the operation of the invention, which is as follows:

With the working parts of the invention occupying the position shown in Figure 1, and assuming that the door D is closed, the door can be opened from its inner side by actuating the handle 19, which operation is effected without transmitting any movement to the housing 28.

To open the door from the outside, and assuming that the lock 90 is unlocked to release the knob 35, the cover plate 73 is pushed inwardly against the spring 74 a sufficient distance for the knob 71 to be grasped and rotated overhand to the right as indicated by the arrow in Figure 3, through an angular distance of ninety degrees against the action of the spring 100 and as definitely limited by the length of the slots 96 and 97, thus correspondingly rotating the disk 55 and hence the dogs 51 to disengage the latter from the keeper lugs 50 as shown at a in broken lines in Figure 5.

The spring 52 is now free to co-act with the head 38 in moving the knob 35 from its recessed position shown in Figure 1 to its projected operating position shown in Figure 2. By now turning the knob 35 overhand to the right as indicated by the previously mentioned arrow in Figure 3, the housing 28 will be correspondingly rotated for its shoulder 34 to co-act with the lug 25 in retracting the bolt 14 to permit the door to be opened.

Upon the release of the knob 71 following its previously described operation disengaging the keeper lugs 50 from the dogs 51, the spring 100 restored the dogs to their original positions circumferentially. Thus in order to restore the knob 35 to its recessed position shown in Figure 1, it is only necessary to push axially inward upon the knob until the keeper lugs 50 snap past the dogs 51 by camming the latter outwardly against the action of the springs 58, and are again in latching engagement with the dogs to releasably retain the knob 35 in its recessed position.

This movement of the knob 35 can of course be conveniently effected from the inner side of the door D by simply pulling upon the handle 84 to the limit of its movement. The release of the dogs from the keeper lugs can be equally well effected from the inner side of the door by moving the knob 99 through its maximum permissible distance against the action of the spring 100, to project the knob 35 from the door and thus render the knob accessible for operation.

I claim:

1. A door lock of the class described comprising: means adapted to define a recess in one side of a door; a bolt urged to locking position; a cup shaped operating knob; means mounting said knob for rotation and for movement axially to a retracted position in said recess wherein the open side of the knob is flush with the surface of the door, and a projected position out of said recess; means operatively connecting said knob to the bolt to move the latter to unlocking position in response to rotary movement of the knob; means for releasably retaining the knob in retracted position; an actuator rotatably mounted co-axially of said knob; means operatively connecting said actuator to said retaining means to release the knob in response to rotation of the actuator; a knob on the actuator disposed in the first knob flush with the outer surface of the latter; a cover member mounted in said first knob; and means urging the cover member to a position spanning the open side of said first knob, yet yielding to manual pressure exerted axially upon the cover member to render said second knob accessible for manipulation.

2. A door lock of the class described comprising: means adapted to define a recess in one side of a door; a bolt urged to locking position; a cup shaped operating knob; means mounting said knob for rotation and for movement axially to a retracted position in said recess wherein the open side of the knob is flush with the surface of the door, and a projected position out of said recess; means operatively connecting said knob to the bolt to move the latter to unlocking position in response to rotary movement of the knob; means for releasably retaining the knob in retracted position; an actuator rotatably mounted co-axially of said knob; means operatively connecting said actuator to said retaining means to release the knob in response to rotation of the actuator; a knob on the actuator disposed in the first said knob flush with the outer surface of the latter; a cover plate mounted on the actuator within the first said knob and having a central pocket; and a spring in the first said knob urging the cover plate to a position wherein it spans the open side of the first said knob, and the second said knob is received in said pocket.

3. A lock of the class described comprising: means defining a recess adapted to open to one side of a door; a bolt urged to locking position; a housing rotatably mounted in the door; means operatively connecting the housing to the bolt to retract same in response to rotary movement of the housing; an operating knob rotatably mounted co-axially of the housing and movable axially from a retracted position in said recess to a projected position out of the recess; means operatively connecting the knob to the housing for rotary movement of the latter by the knob yet rendering the knob free for axial movement; means in the housing co-acting with the knob to urge the latter to projected position; co-acting latching means in the housing for releasably retaining the knob in retracted position; and means operable from a location at the knob for actuating said latching means to release the knob from retracted position.

4. A lock of the class described comprising: means defining a recess adapted to open to one side of a door; a bolt urged to locking position; a housing rotatably mounted in the door; means operatively connecting the housing to the bolt to retract same in response to rotary movement of the housing; an operating knob rotatably mounted co-axially of the housing and movable axially from a retracted position in said recess to a projected position out of the recess; means operatively connecting the knob to the housing for rotary movement of the latter by the knob yet rendering the knob free for axial movement; means in the housing co-acting with the knob to urge the latter to projected position; a keeper member in the housing, carried by said knob; a dog mounted in the housing for movement circumferentially thereof; means urging the dog to one extreme position circumferentially wherein the dog can co-act with the keeper member in latching the knob in retracted position; and means for moving the dog circumferentially from a location at the knob, to a position wherein the keeper member is disengaged so as to render the knob free for movement axially to projected position.

5. A lock of the class described comprising: means defining a recess adapted to open to one side of a door; a bolt urged to locking position; a housing rotatably mounted in the door; means operatively connecting the housing to the bolt to retract same in response to rotary movement of the housing; an operating knob rotatably mounted co-axially of the housing and movable axially from a retracted position in said recess to a projected position out of the recess; means operatively connecting the knob to the housing for rotary movement of the latter by the knob yet rendering the knob free for axial movement; means in the housing co-acting with the knob to urge the later to projected position; a keeper member in the housing fixed to said knob; a dog co-actable with said keeper member; a support rotatably mounted in said housing and on which said dog is pivotally mounted and urged to a latching position; means urging said support rotatively to a position wherein said dog will co-act with the keeper member in latching said knob in retracted position; an actuator co-axially arranged in said housing and connected to said support; and means for rotating said actuator to disengage the dog from the keeper member from a location centrally of the knob.

6. A lock of the class described comprising: means defining a recess adapted to open to one side of a door; a bolt urged to locking position; a housing rotatably mounted in the door; means operatively connecting the housing to the bolt to retract same in response to rotary movement of the housing; a cup shaped operating knob rotatably mounted co-axially of the housing and movable axially from a retracted position in said recess wherein the open side of the knob is flush with the surface of the door, to a projected position out of the recess; means operatively connecting the knob to the housing for rotary movement of the latter by the knob yet rendering the knob free for axial movement; means in the housing co-acting with the knob to urge the latter to projected position; a keeper member in the housing fixed to said knob; a dog co-actable with said keeper member; a support rotatably mounted in said housing and on which said dog is pivotally mounted and urged to a latching position; means urging said support rotatively to a position wherein said dog will co-act with the keeper member in latching said knob in retracted position; a shaft secured to said support co-axially of the housing; a second shaft telescopically associated with the first shaft and projecting through the knob; a pin and slot connection between said shafts by which they are operatively connected rotatably; a knob on the second said shaft disposed flush with the open side of the first said knob; means co-acting with the knobs to provide an unbroken surface therebetween; and means for rendering the last means yieldable sufficiently to permit the second said knob to be grasped and rotated to disengage the dog from the keeper member.

7. A lock of the class described comprising: means defining a recess adapted to open to one side of a door; a bolt urged to locking position; a housing rotatably mounted in the door; means operatively connecting the housing to the bolt to retract same in response to rotary movement of the housing; a cup shaped operating knob rotatably mounted co-axially of the housing and movable axially from a retracted position in said recess wherein the open side of the knob is flush with the surface of the door, to a projected position out of the recess; means operatively connecting the knob to the housing for rotary movement of the latter by the knob yet rendering the knob free for axial movement; means in the housing co-acting with the knob to urge the latter to projected position; a keeper member in the housing fixed to said knob; a dog co-actable with said keeper member; a support rotatably mounted on said housing and on which said dog is pivotally mounted and urged to a latching position; means urging said support rotatively to a position wherein said dog will co-act with the keeper member in latching said knob in retracted position; a shaft secured to said support co-axially of the housing; a second shaft telescopically associated with the first shaft and projecting through the knob; a pin and slot connection between said shafts by which they are operatively connected rotatably; a knob on the second said shaft disposed flush with the open side of the first said knob; a cover plate in the first said knob freely mounted on the second said shaft and having a central pocket; and a coil spring in the first said knob engaging the cover plate to urge the latter axially to a position wherein the second said knob is received in said pocket and the cover plate forms an unbroken surface between the outer sides of the knobs.

8. A lock of the class described comprising: means defining a recess adapted to open to one side of a door; a bolt urged to locking position; a cylindrical housing rotatably mounted in the door and having a longitudinal slot therein; means operatively connecting the housing to the bolt to retract same in response to rotary movement of the housing; an operating knob rotatably mounted co-axially of the housing and movable axially from a retracted position in said recess to a projected position out of the recess; a head slidably mounted in the housing and rigidly secured to the knob; a spring in the housing co-acting with the head to urge the knob to projected position; a pin on the head working in the housing slot to operatively connect the knob to the housing for rotation of the latter by the knob; means for releasably retaining the knob in retracted position; means operable from a location at the knob for actuating said retaining means to release the knob from retracted position; and means co-actable with said pin by which the knob can be moved to retracted position from the other side of the door.

9. A lock of the class described comprising: means defining a recess adapted to open to one side of a door; a bolt urged to locking position; a cylindrical housing rotatably mounted in the door and having a plurality of circumferentially spaced slots extending longitudinally therein; means operatively connecting the housing to the bolt to retract same in response to rotary movement of the housing; an operating knob rotatably mounted co-axially of the housing and movable axially from a retracted position in said recess to a projected position out of the recess; a head slidably mounted in said housing and rigidly connected to said knob; a spring in the housing co-acting with the head to urge the knob to projected position; pins projecting from the head through said slots to operatively connect the knob to the housing for rotation of the latter by the knob; means for releasably retaining the knob in retracted position; means operable from a location at the knob for actuating said retaining means to release the knob from retracted position; a ring slidably mounted on the housing for engagement with said pins; rods projecting from the ring; springs on said rods urging the ring to one extreme position; and a handle at the other side of the door, connected to said rods, for actuation of the ring by the handle and coaction of the ring with the pins in moving the knob to retracted position.

10. A lock of the class described comprising: a bearing sleeve adapted to define a cylindrical recess opening to one side of a door; a housing having a rotatably mounted trunnion at one end and a journal at its other end mounted in said bearing sleeve to support the housing for rotational movement; a bolt urged to locking position; means operatively connecting the housing to the bolt to retract same in response to rotary movement of the housing; a cylindrical operating knob having a portion rotatably mounted in said housing co-axially thereof and for movement axially from a retracted position closely fitting said recess to a position out of said recess; a head slidably mounted in said housing and rigidly connected to said knob; a spring in the housing co-acting with the head to urge the knob to projected position; means operatively connecting the head to the housing for rotation of the latter by the knob; means for releasably retaining the knob in retracted position; and means operable from a location centrally at the knob, to actuate said retaining means and release the knob from retracted position.

11. A lock of the class described comprising: means defining a recess adapted to open to one side of a door; a bolt urged to locking position; a rotatably mounted housing coaxially related to said recess; means operatively connecting the housing to the bolt to retract same in response to rotary movement of the housing; a cup shaped operating knob having a hub projecting into the housing; a head slidably mounted in the housing and having a tubular shank fitting upon the hub; a keeper member having keeper lugs and mounted in said shank with a threaded portion screwed into said hub; means operatively connecting the keeper member to the head for rotation; means operatively connecting the head to the housing for rotation of the latter in response to rotary movement of the knob; a spring in the housing adapted to urge the knob from a retracted position in said recess to a projected position out of the recess; a support rotatably mounted in the housing and having ears; dogs pivoted on the ears; means urging the dogs to a latching position with respect to said keeper lugs; means urging said support to one extreme position circumferentially wherein the dogs will latchingly co-act with the keeper lugs when the knob is moved to retracted position; a shaft projecting from said support into the keeper member; a tubular shaft telescopically receiving the first shaft and projecting through said hub into said knob; a pin and slot connection between said shafts extensibly and rotatably connecting them; a knob fixed to the second shaft in said first knob, for rotating the support to disengage the dogs in a circumferential direction from the keeper lugs in order to release the first said knob for movement by said spring to projected position; a cover plate in the first said knob having a pocket; and a spring in the first said knob urging the cover plate to a position closing the open side of the first knob with the second knob received in said pocket.

12. In locking mechanism for closures, a latch-actuating housing mounted for rotary movement about a fixed axis; an operating member rotatably mounted co-axially of the housing and movable axially relative to said housing; means operatively connecting said member to the housing for rotation of the latter by the member, yet rendering the member free for axial movement; means in the housing urging the operating member to one extreme position of axial movement; means co-acting with the housing and said member to releasably retain the latter in another extreme position of axial movement; and means in the housing having a manually operable portion projecting therefrom co-axially thereof and actuatable from a location at said member to actuate said retaining means and release said member.

13. In locking mechanism for closures, an actuating housing rotatably mounted about a fixed axis; an operating member rotatably mounted co-axially of said housing and movable axially relative to the latter, with a portion of said member projecting into the housing; a spring in the housing co-actable with said portion of the operating member to urge the housing axially to one extreme position; the housing and said portion of the operating member having co-acting pin and slot means operatively connecting the operating member to the housing for rotation of the latter by said member while rendering the latter axially movable as aforestated; means for releasably retaining the operating member in one extreme position against the action of said spring; and means for actuating the retaining means to release the operating member.

14. In locking mechanism for closures, an actuating housing mounted for rotary movement about a fixed axis; an operating member rotatably mounted co-axially of the housing and movable axially; means operatively connecting said member to the housing for rotation of the latter by the member, yet rendering the member free for axial movement; means in the housing urging the operating member to one extreme position of axial movement; a keeper member in the housing fixed to the operating member; a dog co-actable with said keeper member; a support rotatably mounted in said housing and mounting said dog; means urging said support rotatably to a position wherein said dog engages the keeper member to latch the operating member in one extreme position of axial movement; and means for rotating said support to disengage the dog from the keeper member.

15. In locking mechanism for closures, a bearing member adapted to define a recess; a rotatably mounted actuating housing journaled at one end in the bearing member; an operating member having a supporting portion in said housing, mounting the operating member for rotation and for movement axially into and out of said recess; means operatively connecting said portion of the operating member to said housing for rotation of the latter by the operating member; means urging the operating member out of said recess; means for releasably retaining the operating member in said recess; and means for actuating the retaining means to release the operating member.

16. In locking mechanism for closures, an actuating housing rotatably mounted about a fixed axis and having a longitudinal slot therein; an operating member at one side of the closure, rotatably mounted co-axially of said housing and movable axially; said member having a portion in the housing projecting into said slot to operatively connect the housing to the operating member for rotation by the latter; means urging the operating member axially to one extreme position; means for releasably retaining the operating member in another extreme position; means operable from a location at said operating member for actuating the retaining means to release the operating member; and means co-actable with said portion of the operating member, by which the latter can be moved to the first said extreme position from the other side of the closure.

17. In locking mechanism for closures, an operating member for the mechanism having a cavity therein; means mounting said member for movement to occupy operating and non-operating positions; means urging said member to operating position; means for releasably retaining said member in non-operating position; and means for actuating said retaining means to release said member, and including a manually operable portion projecting freely into said cavity for manipulation.

18. In locking mechanism for closures, an operating member for the mechanism having a cavity therein; means mounting said member for movement to occupy operating and non-operating positions; means urging said member to operating position; means for releasably retaining said member in non-operating position; a manually operable actuator for actuating said retaining means to release said member and including a portion projecting freely into said cavity for actuation; and a cover member spanning said cavity to coact with said portion and operating member in defining an unbroken surface substantially flush with the open side of said cavity.

19. In locking mechanism for closures, an operating member for the mechanism having a cavity therein; means mounting said member for movement to occupy operating and non-operating positions; means urging said member to operating position; means for releasably retaining said member in non-operating position; manually operable means for actuating said retaining means to release said member, and including a manipulatable portion in said cavity; and yieldable means closing said cavity substantially flush with the open side thereof, and yielding to manual pressure sufficiently to render said portion accessible for manipulation.

20. In locking mechanism for closures, an operating member for the mechanism having a cavity therein; means mounting said member for movement to occupy operating and non-operating positions; means urging said member to operating position; means for releasably retaining said member in non-operating position; a manually operable actuator for actuating said retaining means to release said member, and including a portion projecting freely into said cavity for actuation; a cover plate mounted in said cavity and having a pocket; and spring means urging the cover plate to a position wherein said portion of the actuator is received in said pocket and the cover plate spans the open side of said cavity substantially flush with said portion and said member.

ALBERT J. LEONARD.